United States Patent
Auer et al.

(10) Patent No.: US 11,394,833 B2
(45) Date of Patent: Jul. 19, 2022

(54) TELECOMMUNICATION NETWORK SUBSCRIBER CONVERSION USING CLUSTER-BASED DISTANCE MEASURES

(71) Applicant: AT&T Intellectual Property I, L.P., Atlanta, GA (US)

(72) Inventors: Craig Auer, Webster Groves, MO (US); Wen-Ling Hsu, Bridgewater, NJ (US); Guang-Qin Ma, Kendall Park, NJ (US); Clayton Moore, Dallas, TX (US); Edabeth Brown, Midlothian, TX (US); Robert Robertson, Jr., Southlake, TX (US); Kevin McDorman, Dallas, TX (US); Brian Economaki, Richardson, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 248 days.

(21) Appl. No.: 16/872,110

(22) Filed: May 11, 2020

(65) Prior Publication Data
US 2021/0352179 A1    Nov. 11, 2021

(51) Int. Cl.
*H04M 15/00* (2006.01)
*G06Q 20/02* (2012.01)

(52) U.S. Cl.
CPC ........ *H04M 15/765* (2013.01); *G06Q 20/023* (2013.01); *H04M 15/41* (2013.01); *H04M 15/43* (2013.01); *H04M 15/705* (2013.01); *H04M 15/8033* (2013.01)

(58) Field of Classification Search
CPC .... H04M 15/765; H04M 15/41; H04M 15/43; H04M 15/705; H04M 15/8033; G06Q 20/023

USPC ........................................... 705/40
See application file for complete search history.

(56) References Cited

U.S. PATENT DOCUMENTS

| 7,954,698 B1 * | 6/2011 | Pliha ...................... G06Q 40/02 235/379 |
| 2018/0211270 A1 * | 7/2018 | Wu ..................... G06Q 30/0269 |
| 2021/0125160 A1 * | 4/2021 | Lu ....................... G06F 16/2468 |

OTHER PUBLICATIONS

Adams, Colins, "Same-day ACH and Real time Payments—The increasing diverse US Payments ecosystem", Lipis Advisors,(2017), pp. 1-12.

* cited by examiner

*Primary Examiner* — Ahmad F. Matar
*Assistant Examiner* — Jirapon Intavong

(57) ABSTRACT

A processing system deployed in a telecommunication network may obtain data records including data associated with subscribers, cluster the subscribers into a plurality of clusters in accordance with the data, identify a first set of subscribers enrolled in automated clearing house (ACH) payment agreements, and identify a second set of subscribers not enrolled in ACH payment agreements, calculate distance measures for the second set of subscribers, where for each respective subscriber of the second set of subscribers, the distance measures include a respective distance measure of the respective subscriber to a feature centroid for a subset of the first set of subscribers in a same cluster as the respective subscriber, select a subset of the second set of subscribers based upon the plurality of distance measures for receiving an offer in an ACH payment agreement, and present communications to the subset of the second set of subscribers with the offer.

20 Claims, 6 Drawing Sheets

```
 1  procedure target customers (A: list of non-ACH paying customers, s_thresh similarity threshold, c_thresh cost threshold)
 2    foreach customer in A:
 3      customer.similarity = calculate ACH similarity
 4      customer.cost = calculate expected transaction cost
 5
 6    A = sort by similarity and cost
 7
 8    targets = []
 9    foreach customer in A:
10      if customer.similarity > s_thres and customer.cost > c_thres:
11        targets: add customer
12
13    return targets
```

FIG. 4

TELECOMMUNICATION NETWORK SUBSCRIBER CONVERSION USING CLUSTER-BASED DISTANCE MEASURES

The present disclosure relates generally to telecommunication network subscriber payment systems, and more particularly to methods, computer-readable media, and apparatuses for selecting telecommunication network subscribers for offers to enroll in new automated clearing house payment agreements based upon distance measures to feature centroids for subscribers with existing automated clearing house payment agreements within a same cluster.

BACKGROUND

An automated clearing house (ACH), such as the Automated Clearing House Network (ACHN) in the United States, is a computer-based network that enables a direct payment by debiting a payer's bank account and sending the funds directly to a receiver's account. Only the financial institution's routing and account number may be needed to make an ACH payment. The primary benefit of an ACH payment is the minimal transactional cost assessed to collect the payment since it may be less than 1% of the cost of other payment methods, such as paying via credit card, debit card, paper check, etc.

SUMMARY

In one example, the present disclosure describes a method, computer-readable medium, and apparatus for selecting telecommunication network subscribers for offers to enroll in new automated clearing house payment agreements based upon distance measures to feature centroids for subscribers with existing automated clearing house payment agreements within a same cluster. For instance, in one example, a processing system including at least one processor deployed in a telecommunication network may obtain data records of the telecommunication network including data associated with a plurality of subscribers, cluster the plurality of subscribers into a plurality of clusters in accordance with the data associated with the plurality of subscribers, identify a first set of subscribers of the plurality of subscribers enrolled in existing automated clearing house payment agreements with the telecommunication network, and identify a second set of subscribers of the plurality of subscribers not enrolled in the existing automated clearing house payment agreements with the telecommunication network. The processing system may next calculate a plurality of distance measures for the second set of subscribers, where for each respective subscriber of the second set of subscribers, the plurality of distance measures includes a respective distance measure of the respective subscriber of the second set of subscribers to a feature centroid for a subset of the first set of subscribers that is in a same cluster of the plurality of clusters as the respective subscriber of the second set of subscribers. The processing may then select a subset of the second set of subscribers based upon the plurality of distance measures for receiving an offer in a new automated clearing house payment agreement and present communications to the subset of the second set of subscribers with the offer to enroll in the new automated clearing house payment agreement.

BRIEF DESCRIPTION OF THE DRAWINGS

The present disclosure can be readily understood by considering the following detailed description in conjunction with the accompanying drawings, in which:

FIG. 4 illustrates an example algorithm for selecting which subscribers to target for receiving offers to enroll in new automated clearing house payment agreements based upon both a similarity threshold and a cost saving threshold, in accordance with the present disclosure;

To facilitate understanding, identical reference numerals have been used, where possible, to designate identical elements that are common to the figures.

DETAILED DESCRIPTION

Figure 1:
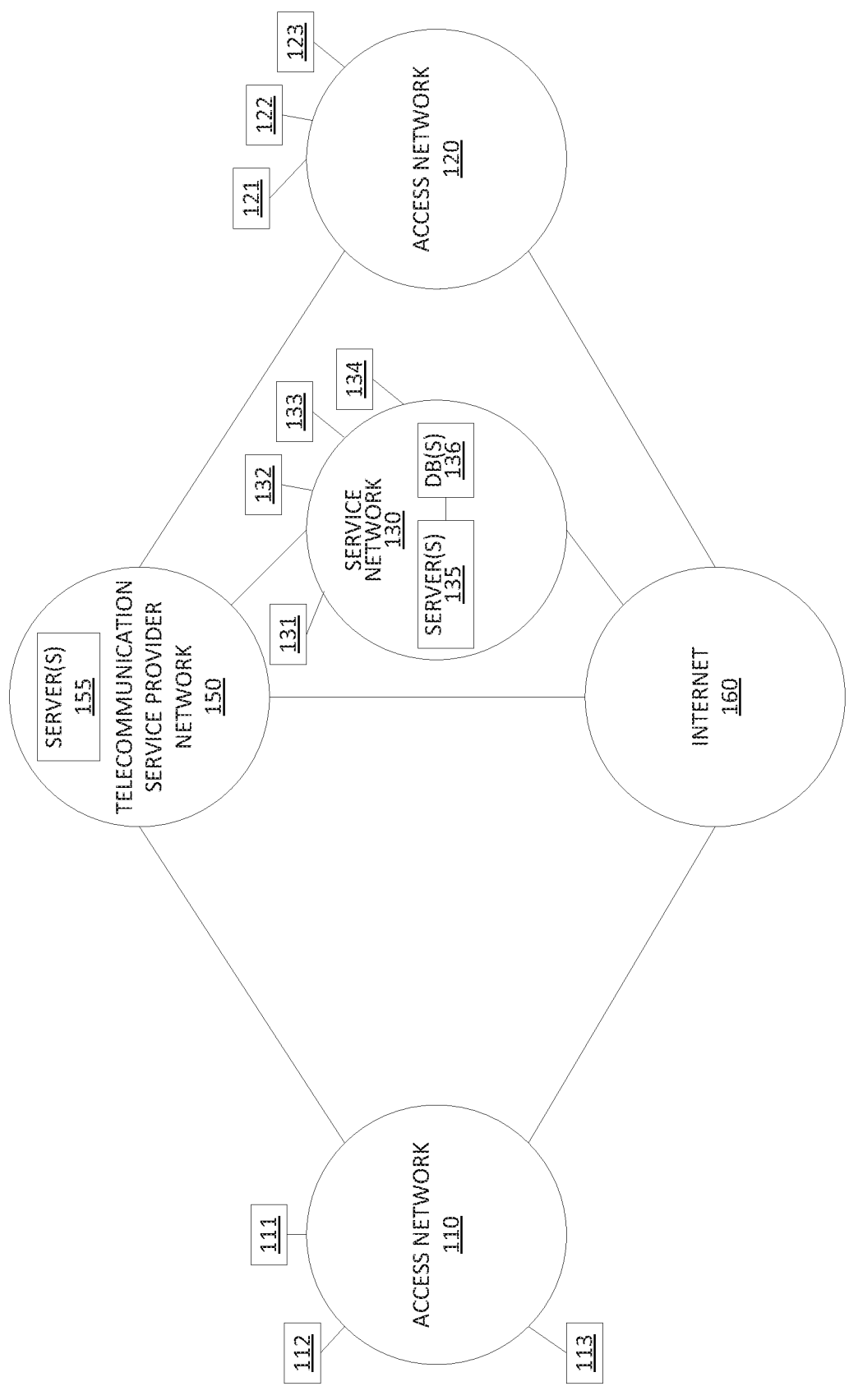
FIG. 1 illustrates one example of a system related to the present disclosure.

The present disclosure broadly discloses methods, non-transitory (i.e., tangible or physical) computer-readable storage media, and apparatuses for selecting telecommunication network subscribers for offers to enroll in new automated clearing house payment agreements based upon distance measures to feature centroids for subscribers with existing automated clearing house payment agreements within a same cluster.

An automated clearing house (ACH), such as the Automated Clearing House Network (ACHN) in the United States, is a computer-based network that enables a direct payment by debiting a payer's bank account and sending the funds directly to a receiver's account. Only the financial institution's routing and account number may be needed to make an ACH payment. In this regard it should be noted that as referred to herein, an ACH payment broadly refers to any type of direct payment by debiting a payer's bank account and sending the funds directly to a receiver's account (e.g., as soon as practicable once the payment is initiated, in accordance with the processing limitations of any computing and/or networking platform(s) that enable the transfer/payment, and subject to any settlement practices that may be applicable). The primary benefit of an ACH payment is the minimal transactional cost assessed to collect the payment since it may be less than 1% of the cost of other payment methods, such as paying via credit card, debit card, paper check, etc. Besides ACH, other popular bill payment methods, such as, credit card, debit card, and paper checks are used by a significant number of telecommunication network subscribers. For example, credit card payments are considered to be popular because of the rewards and cash back opportunities offered. Paper checks are still popular for security, budgeting, and tracking purposes. Some subscribers, however, may not have a strong reason for using one payment method over another.

Examples of the present disclosure provide offers and incentives to subscribers who do not currently pay via ACH to switch to ACH. In particular, examples of the present disclosure provide a machine learning process that calculates a metric that is indicative of the likelihood of telecommunication network subscribers switching from non-ACH payment methods to ACH payment methods. In one example, the present disclosure may first cluster all subscribers, or subscribers within a region of a telecommunication network, e.g., via an unsupervised clustering technique based on a set of features associated with subscribers, such as: account information, usage of telecommunication network services, past payment history, and so forth. In one example, the present disclosure may then calculate distances between ACH-paying and non-ACH-paying customers, e.g., based on the same or a different set of features. In particular, the present disclosure may calculate these distances for each non-ACH-paying customer to a feature centroid of ACH-paying customers within a same cluster. These distances, or similarity measures, explain the customer inertia/loyalties of changing their payment methods to ACH. In one example, the present disclosure selects those subscribers having similarity scores/distances that are most indicative of a likelihood to switch, e.g., in order to present offers to switch from non-ACH payment methods to ACH payment methods. In addition, in one example, the present disclosure also selects and/or calculates incentives to entice these subscribers to adopt new ACH payment agreements. For instance, in one example, the cost of the incentives is selected in consideration of the savings of transactional costs. Accordingly, the telecommunication network may most effectively target ACH payment-likely customers.

These and other aspects of the present disclosure are discussed in greater detail below in connection with the examples of FIGS. 1-6.

To aid in understanding the present disclosure, FIG. 1 illustrates an example system 100 comprising a plurality of different networks in which examples of the present disclosure may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed-mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office.

In one example, telecommunication service provider network 150 may also include one or more servers 155. In one example, the servers 155 may each comprise a computing device or system, such as computing system 600 depicted in FIG. 6, and may be configured to host one or more centralized system components. For example, a first centralized system component may comprise a database of assigned telephone numbers, a second centralized system component may comprise a database of basic customer account information for all or a portion of the customers/subscribers of the telecommunication service provider network 150, a third centralized system component may comprise a cellular network service home location register (HLR), e.g., with current serving base station information of various subscribers, and so forth. Other centralized system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other centralized system components may include, for example, a layer 3 router, a short message service (SMS) server, a voicemail server, a video-on-demand server, a server for network traffic analysis, and so forth. It should be noted that in one example, a centralized system component may be hosted on a single server, while in another example, a centralized system component may be hosted on multiple servers, e.g., in a distributed manner. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, endpoint devices 121-123, and service network 130, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of endpoint devices 111-113 and 121-123 may represent one or more user/subscriber devices.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide service network 130 functions, e.g., of a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, an Internet Protocol private branch exchange (IPPBX), and so forth, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the telecommunication service provider network 150. For example, the service network 130 may comprise one or more devices for providing services to subscribers, customers, and/or users. For example, telecommunication service provider network 150 may provide a cloud storage service, web server hosting, and other services. As such, service network 130 may represent aspects of telecommunication service provider network 150 where infrastructure for supporting such services may be deployed.

In one example, the service network 130 links one or more devices 131-134 with each other and with Internet 160, telecommunication service provider network 150, devices accessible via such other networks, such as endpoint devices 111-113 and 121-123, and so forth. In one example, devices 131-134 may each comprise a telephone for analog or digital telephony, a mobile device, a cellular smart phone, a laptop, a tablet computer, a desktop computer, a bank or cluster of such devices, and the like. In an example where the service network 130 is associated with the telecommunication service provider network 150, devices 131-134 of the service network 130 may comprise devices of network personnel, such as customer service agents, sales agents, marketing personnel, or other employees or representatives who are tasked with addressing customer-facing issues and/or personnel for network maintenance, network repair, construction planning, and so forth.

In the example of FIG. 1, service network 130 may include one or more servers 135 which may each comprise all or a portion of a computing device or processing system, such as computing system 600, and/or a hardware processor element 602 as described in connection with FIG. 6 below, specifically configured to perform various steps, functions, and/or operations for selecting telecommunication network subscribers for offers to enroll in new automated clearing house payment agreements based upon distance measures to feature centroids for subscribers with existing automated clearing house payment agreements within a same cluster, as described herein. For example, one of the server(s) 135, or a plurality of servers 135 collectively, may perform operations in connection with the example method 500 of FIG. 5, or as otherwise described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 6 and discussed below) or multiple computing devices collectively configured to perform various steps, functions, and/or operations in accordance with the present disclosure.

In one example, service network 130 may also include one or more databases (DBs) 136, e.g., physical storage devices integrated with server(s) 135 (e.g., database servers), attached or coupled to the server(s) 135, and/or in remote communication with server(s) 135 to store various types of information in support of examples of the present disclosure for selecting telecommunication network subscribers for offers to enroll in new automated clearing house payment agreements based upon distance measures to feature centroids for subscribers with existing automated clearing house payment agreements within a same cluster. As just one example, DB(s) 136 may be configured to receive and store network operational data collected from the telecommunication service provider network 150, such as call logs, mobile device location data, control plane signaling and/or session management messages, data traffic volume records, call detail records (CDRs), error reports, network impairment records, performance logs, alarm data, television usage information, such as live television viewing, on-demand viewing, etc., and other information and statistics, which may then be compiled and processed, e.g., normalized, transformed, tagged, etc., and forwarded to DB(s) 136, via one or more of the servers 135.

In one example, DB(s) 136 may be configured to receive and store records from customer, user, and/or subscriber interactions, e.g., with customer facing automated systems and/or personnel of a telecommunication network service provider or other entities associated with the service network 130. For instance, DB(s) 136 may maintain call logs and information relating to customer communications which may be handled by customer agents via one or more of the devices 131-134. For instance, the communications may comprise voice calls, online chats, etc., and may be received by customer agents at devices 131-134 from one or more of devices 111-113, 121-123, etc. The records may include the times of such communications, the start and end times and/or durations of such communications, the touchpoints traversed in a customer service flow, results of customer surveys following such communications, any items or services purchased, the number of communications from each user, the type(s) of device(s) from which such communications are initiated, the phone number(s), IP address(es), etc. associated with the customer communications, the issue or issues for which each communication was made, etc.

Alternatively, or in addition, any one or more of devices 131-134 may comprise an interactive voice response system (IVR) system, a web server providing automated customer service functions to subscribers, etc. In such case, DB(s) 136 may similarly maintain records of customer, user, and/or subscriber interactions with such automated systems. The records may be of the same or a similar nature as any records that may be stored regarding communications that are handled by a live agent. Similarly, any one or more of the devices 131-134 may comprise a device deployed at a retail location that may service live/in-person customers. In such case, the one or more of devices 131-134 may generate records that may be forwarded and stored by DB(s) 136. The records may comprise purchase data, information entered by employees regarding inventory, customer interactions, surveys responses, the nature of customer visits, etc., coupons, promotions, or discounts utilized, and so forth. In still another example, any one or more of the devices 111-113 or 121-123 may comprise a device deployed at a retail location that may service live/in-person customers and that may generate and forward customer interaction records to DB(s) 136.

In one example, DB(s) 136 may alternatively or additionally receive and store data from one or more external data feeds. For instance, one of the endpoint devices 111-113 or 121-123 may represent a server of a consumer credit entity (e.g., a credit bureau, a credit card company, etc.), a merchant, or the like. In such an example, DB(s) 136 may obtain one or more data sets/data feeds comprising information such as: consumer credit scores, credit reports, purchasing information and/or credit card payment information, credit card usage location information, and so forth.

Figure 5:
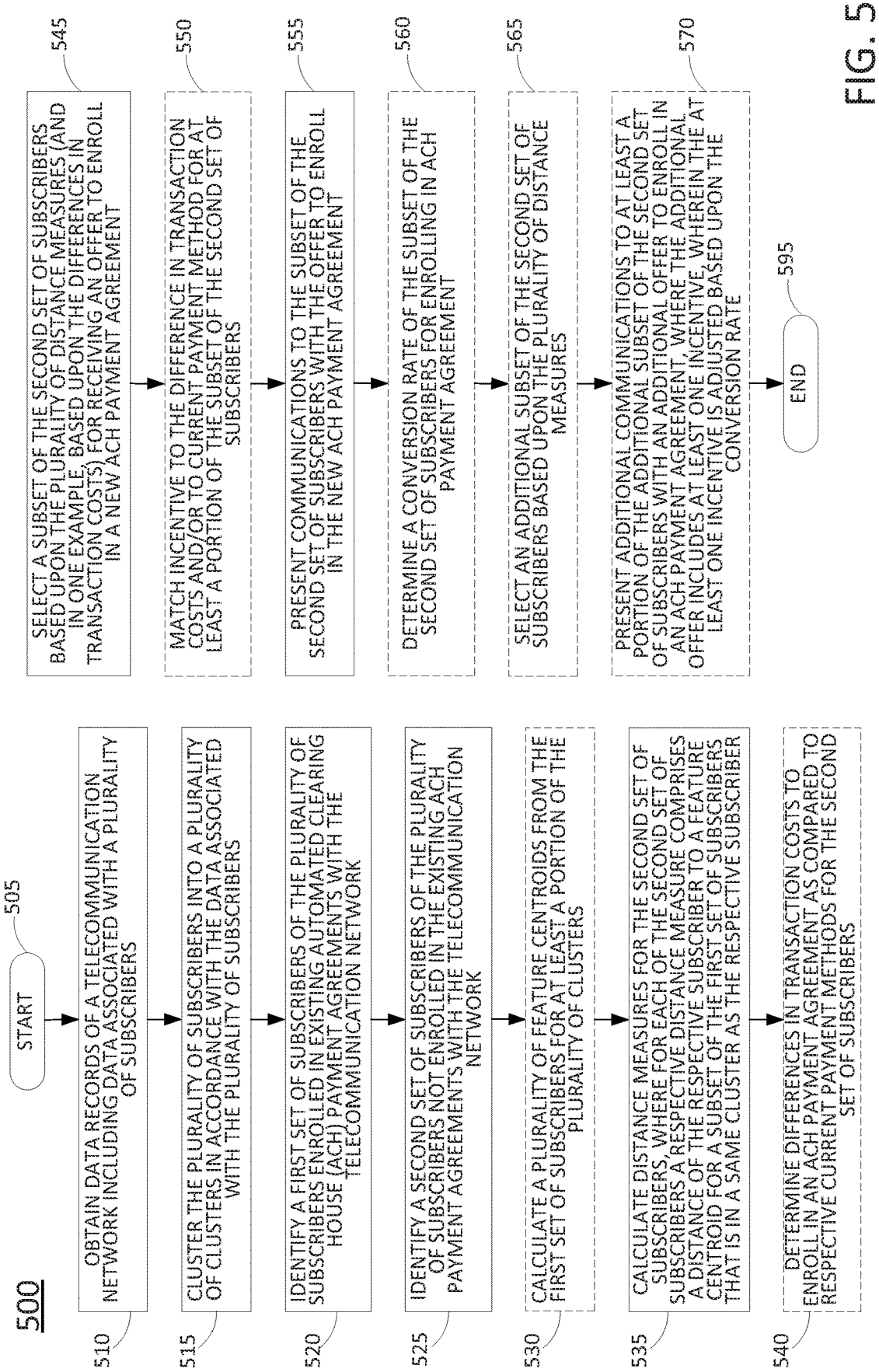
FIG. 5 illustrates a flowchart of an example method for selecting telecommunication network subscribers for offers to enroll in new automated clearing house payment agreements based upon distance measures to feature centroids for subscribers with existing automated clearing house payment agreements within a same cluster.

In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like. As noted above, in one example, one or more of servers 135 may comprise a processing system that is configured to perform operations for selecting telecommunication network subscribers for offers to enroll in new automated clearing house payment agreements based upon distance measures to feature centroids for subscribers with existing automated clearing house payment agreements within a same cluster, as described herein. For instance, a flowchart of an example method 500 for selecting telecommunication network subscribers for offers to enroll in new automated clearing house payment agreements based upon distance measures to feature centroids for subscribers with existing automated clearing house payment agreements within a same cluster is illustrated in FIG. 5 and described in greater detail below.

To illustrate, in one example, the server(s) 135 may first obtain data records of the telecommunication network, including data associated with a plurality of subscribers. The data may include, for each subscriber, a number of devices associated with a subscriber account, one or more types of devices associated with the subscriber account, a service level associated with the subscriber account (e.g., unlimited mobile data, 4 Gb/month, 2 Gb/month, an international calling agreement (or not), 300 Mbps internet, a particular tier of cable television service, subscriptions to premium television channels, etc.), a billing address (e.g., a location associated with the subscriber account), an income category, a number of household members associated with the subscriber account, one or more types of telecommunications services from the telecommunication network associated with the subscriber account (e.g., one, several, or all of television, phone, Internet, and/or cellular service), a service usage level associated with the subscriber account (e.g., daily, per week, per month, etc., such as: number of hours of active television set-top-box activity, a number of hours of on-demand video streaming, a number of hours of active internet usage, an upload and/or download volume, a number of phone calls, etc.), and so on. The data may be stored in and obtained from DB(s) 136 (e.g., billing systems, customer account databases, etc.) or may be obtained directly from devices in telecommunication service provider network 150 (e.g., servers 155, such as video-on-demand servers, serving gateways, routers, switches, and so on), from third-party devices, such as those of a credit monitoring agency, a credit card company, a retailer, and so forth.

In one example, the server(s) 135 may then cluster the plurality of subscribers into a plurality of clusters in accordance with the data associated with the plurality of subscribers. In one example, the clustering may be performed with regard to all subscribers of the telecommunication service provider network 150. In another example, the clustering may by performed with regard to a segment of subscribers of the telecommunication service provider network 150, e.g., for all subscribers in a region, such as northeast United States, for all subscribers in a state or other geographic zone, and so forth. In various examples, less than all subscribers in a given region may be evaluated for clustering, such as excluding prepaid account subscribers, excluding corporate account subscribers, excluding governmental subscribers, and so forth.

In one example, the clustering may comprise an unsupervised clustering, such as K-means clustering. In other examples, the clustering may utilize a different process, such as another type of partitional clustering, a hierarchical clustering technique, a Gaussian mixture model (GMM)-based clustering, a supervised clustering, such as K nearest neighbor (KNN), and so forth. In one example, the clustering may include a principal component analysis (PCA) feature aggregation. For instance, there may be 30 to 70 or more different features, or data points, relating to each subscriber that may be considered in connection with the present examples. PCA may reduce the number of dimension to a lesser number of dimensions, or principal components, e.g., to three dimensions, to five dimensions, etc.

Figure 2:
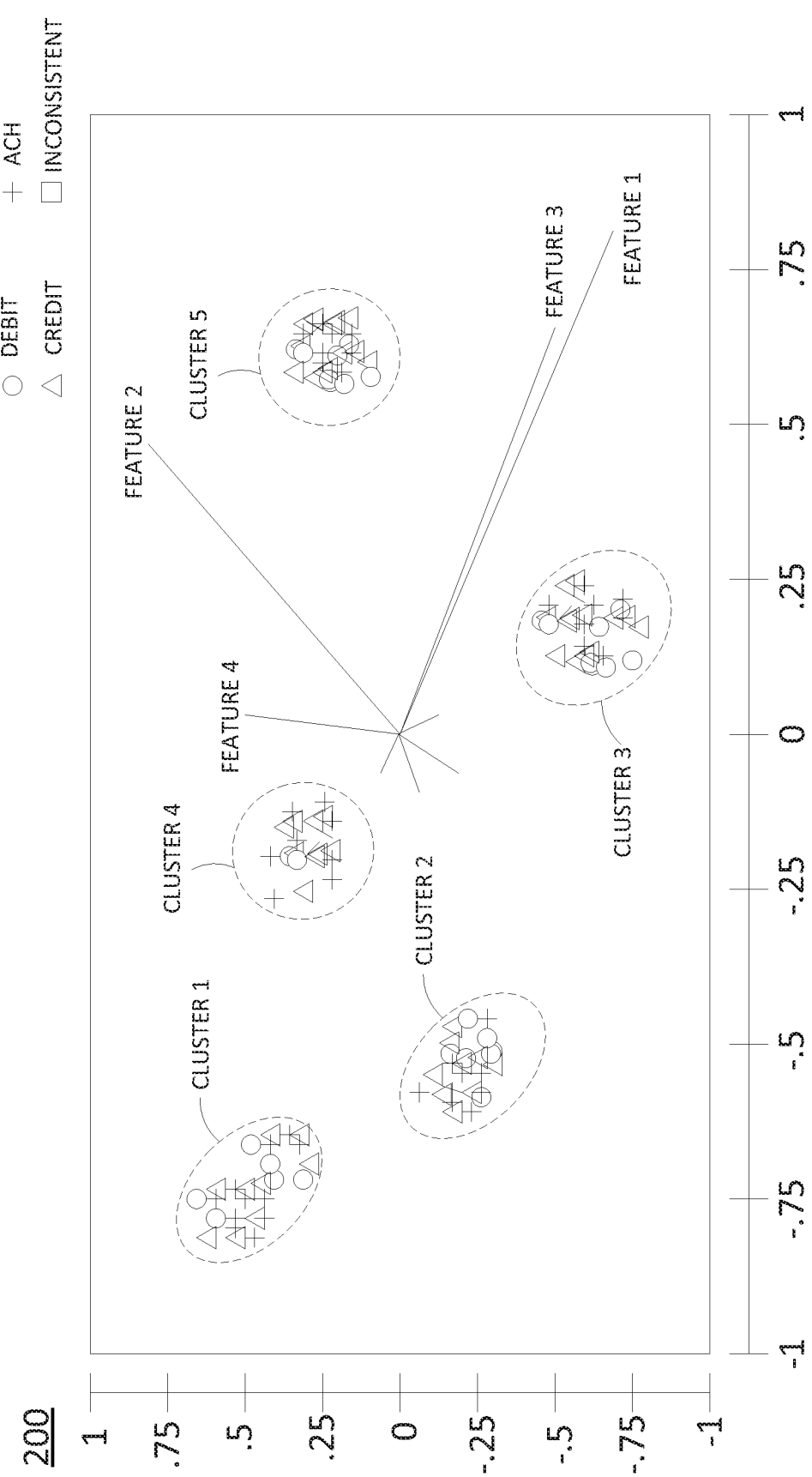
FIG. 2 illustrates an example chart of clustering results, e.g., including dimension reduction techniques, for subscribers of a telecommunication network, in accordance with the present disclosure.

An example of clustering results is illustrated in the chart 200 of FIG. 2. For instance, as can be seen in the chart 200 there may be 8 dimensions, or principal components, e.g., feature 1, feature 2, feature 3, feature 4, etc. In this example, each of the features 1-4 may comprise a dimensions that is the result of a feature aggregation via PCA. For instance, from the original features/data points, there may be a feature of "number of on-time payments in last 12 months" and also a feature of "number of missed payments in last 12 months." In this case, application of PCA may result in the collapsing, or combining of these features from separate dimensions into a combined dimensions, thereby reducing the dimensionality of the data space. Similarly, there may be a feature of "number of missed payments in 24 months." Such a feature may similarly be aggregated with the above features via PCA. Thus, a feature space may have the number of dimensions reduced by a factor of 10 or more via PCA. It should be noted that the combination of dimensions, the scaling of factors of each feature contributing to the various dimensions, and so forth may be driven by favoring those factors (dimensions) which are the most useful, and contribute the most, to creating well-defined clusters (e.g., maximum correlation intra-cluster, minimum correlation inter-cluster). Accordingly, FIG. 2 shows the results of dimension reduction techniques to plot the components of subscriber-level data (services subscription, services usage, and other subscriber-specific data). Feature 1 (type of customer) and feature 2 (type of services) capture the major differences between subscriber clusters. Continuing with the present example, it appears that the clustering results in 5 well-separated clusters, e.g., clusters 1-5. Notably, the clusters 1-5 appear to include a mix of subscribers with existing ACH payment agreements (ACH) as well as subscribers using other forms of payment (credit, debit, or "inconsistent" for subscribers paying in different ways for different billing periods, for example).

Returning to the example of FIG. 1, after clustering, the server(s) 135 may then calculate a respective distance measure for each non-ACH-paying subscriber to ACH-paying subscribers within a same cluster. It is observed that attempting to find similarity between non-ACH paying subscribers and ACH-paying subscribers over the entire subscriber base may involve differences that may remain too significant. However, first clustering subscribers by overall similarity and then calculating distances to ACH-paying subscribers within each cluster improves accuracy. The differences are less, and the most promising subscribers to target for switching are much closer in similarity to the ACH-paying subscribers. In one example, server(s) 135 may first identify clusters according to a cluster identification technique. Server(s) 135 may next calculate a feature centroid for ACH-paying subscribers for each cluster (e.g., an average of the features of ACH-paying subscribers within a same cluster). In addition, in such an example, server(s) 135 may then calculate the respective distance measure for each non-ACH paying subscriber in a cluster to the feature centroid for ACH-paying subscribers of the cluster. For instance, the distance measure may comprise a Euclidean distance vector between a first point in the feature space representing the non-ACH-paying subscriber and a point in the feature space representing the feature centroid for ACH-paying subscribers. In one example, the distance measure (or "similarity score") may be calculated via a neural network, a decision tree, such as a gradient boosted decision tree, or the like. In one example, the feature space in which the distance metric is calculated may comprise the feature space that results from a PCA dimensionality reduction/feature aggregation, as discussed above. Notably, the distance metric represents a similarity of a non-ACH-paying subscriber in a cluster to ACH-paying customers from the same cluster. The calculated distance of the non-ACH-paying subscribers to their closest ACH-paying neighbors (those in the same cluster), represents how loyal those subscribers are to their current payment methods in addition to the attractiveness of those subscribers to adopt new ACH payment agreements.

In one example, server(s) 135 may select a subset of the non-ACH-paying subscribers for presenting offers to enroll in new ACH payment agreements. In other words, a select portion of non-ACH-paying subscribers is targeted for communications offering and/or incentivizing such subscribers to switch to making ACH payments. In one example, the number and/or percentage of non-ACH-paying subscribers may be selected according to a fixed percentage threshold, an adaptive percentage threshold (e.g., based upon a given budget, based upon feedback of past results of similar offers in a different segment of subscribers of the telecommunication service provider network 150, or other factors), a hard number/distance metric, and so forth.

Figure 3:
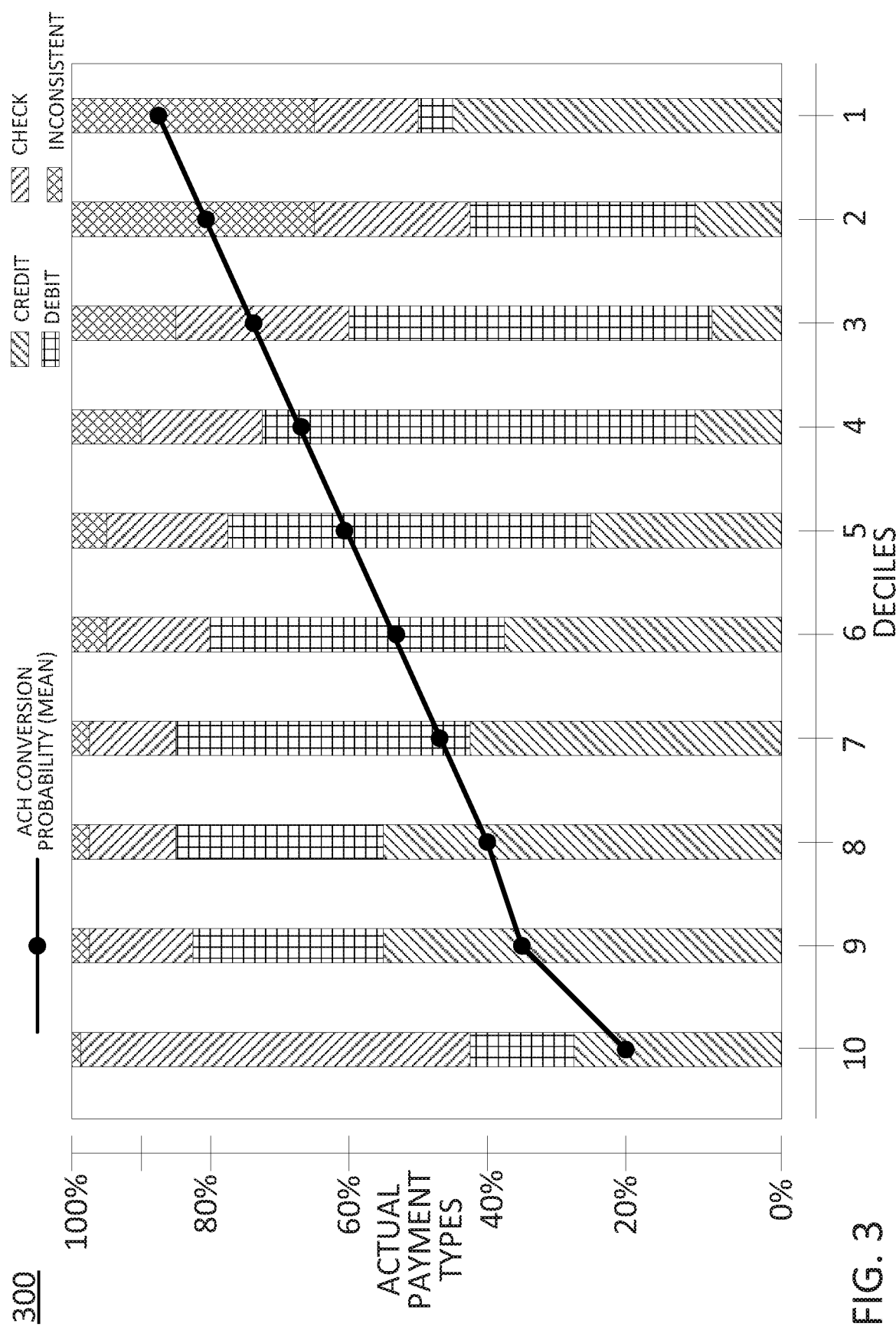
FIG. 3 illustrates an example chart of buckets (e.g., deciles) versus percentages of subscribers within each decile having current payment types, in accordance with the present disclosure.

In one example, server(s) 135 may categorize the non-ACH-paying subscribers into tiers, or buckets, based upon the distance metrics. For instance, FIG. 3 illustrates an example chart 300 of buckets (e.g., deciles) versus the percentages of subscribers within each decile having current payment types of: credit, debit, check, and inconsistent. In addition the chart 300 illustrates the probability of conversion to ACH-payments for subscribers within each decile, e.g., the mean conversion percentage/rate of subscribers within each decile when presented with offers to enroll in new ACH payment agreements. Bucketizing subscribers along these similarity deciles provides the ability to target and incentivize the subscribers most likely to switch. In one example, the server(s) 135 may learn a conversion factor, or function, to map distance metrics to actual conversion probabilities (e.g., based upon feedback of actual results in a test market, for instance). For example, it is observed that non-ACH-paying subscribers with higher similarity scores/distance metrics (e.g., top 40% of scored subscribers) may be more than twice as likely to adopt ACH payment methods than the average.

In one example, the server(s) 135 may select one or more of the deciles for presenting the offers to enroll in new ACH payment agreements. For instance, an operator may set a marketing budget and may provide a cost per communication to the server(s) 135, e.g., via one of the endpoint devices 131-134. The server(s) 135 may then determine from which decile(s) subscribers may be selected to receive the offers. Alternatively, or in addition, the server(s) 135 may provide an interface to one of the endpoint devices 131-134 which may allow a user to select one or more deciles, to provide a cost of communication to each subscriber, and to obtain an estimate from server(s) 135 of a cost to provide offers to subscribers in the one or more deciles. In addition, the server(s) 135 may provide an estimate of the number and/or the percentage of subscribers who are expected to convert to ACH payment agreement, the estimated cost savings to the telecommunication service provider network 150, and so forth. For instance, a user interface may provide a chart, such as chart 300 allowing a user to visualize the scope of the non-ACH-paying subscribers, the mix of current payment types, the relative similarities, per-decile, of the non-ACH-paying subscribers to ACH-paying subscribers, and so on. In one example, server(s) 135 and/or DB(s) 136 may maintain records of the historical cost of communications per subscriber for one or more modes of communication for presenting the offers to enroll in new ACH-payment agreements. In such case, a user may select one or more deciles, and the server(s) 135 may provide one or more cost options for presenting the offers to the subscribers in the decile(s) that is/are selected.

In one example, server(s) 135 may consider both the similarity (distance metric) with an expected cost savings to determine which non-ACH-paying subscribers should receive offers to switch/enroll in new ACH payment agreements. For instance, FIG. 4 illustrates an illustrative algorithm 400 for selecting which subscribers to target for receiving offers based upon both a similarity threshold (s_thres) and a cost saving threshold (c_thres). In particular, lines 9-11 of the algorithm 400 evaluate each subscriber (or "customer") in a set of subscribers/customer (set "A") and add a subscriber/customer if the distance measure (customer.similarity) is greater than the similarity threshold and if the expected cost savings of the transaction costs (customer.cost) is greater than the cost savings threshold.

In addition to the foregoing, server(s) 135 may also calculate one or more incentives to include in the presentation of the offers to enroll in new ACH payment agreements. For instance, subscribers who currently pay via credit card may obtain rewards from their credit card providers for the use thereof, e.g., as a percentage of purchases made. For these subscribers, there may be a disincentive to switch to ACH payment agreements, which may result in foregoing such credit card usage rewards. In other cases, subscribers may have no incentive to switch if automatic debit card payments remain convenient for the subscriber and switching to ACH payment agreements is considered to be an unnecessary task. Thus, in one example, the server(s) 135 may match incentives to differences in transaction costs per-subscriber or per-category of subscriber, and/or may match incentives to current payment methods for all or a portion of the subscribers who may be targeted to receive the offers to switch to ACH payment agreements. For example, server(s) 135 may determine differences in transaction costs for subscribers of the second set of subscribers to enroll in the ACH payment agreements as compared to respective current payment methods for the subscribers of the second set of subscribers. Then the server(s) 135 may determine an available budget to provide one or more incentives to one or more of the subscribers. In addition, the server(s) 135 may select an incentive within the available budget, or may present an option to an operator to select an incentive within the available budget.

For instance, the server(s) 135 may determine for a given subscriber that an ACH payment agreement will save the telecommunication service provider network 150 $3.00 per month for 12 months as compared to a current payment method (e.g., credit card payment). In addition, the server(s) 135 may have previously determined that the subscriber is within a particular decile that has an average/mean conversion rate of 80%. In such case, the server(s) 135 may determine that $36.00 may be saved in the next year if the subscriber can be convinced to switch. Thus, an incentive of up to $35.99 could be considered, e.g., for a given year. However, in view of the 20% likelihood that the subscriber does not convert, the server(s) 135 may calculate a maximum inventive of 28.79 (80% of $36.00). If the same criterion is applied to other subscribers in the same decile, over a sufficiently large segment of subscribers, it may be expected that the conversion rate remains at least the historically observed average. Thus, over the segment of subscribers it may be expected that the inventive budget does not exceed the expected cost savings of those subscribers who are enticed to switch to ACH payment agreements. In one example, a minimum offset may be set by an operator for the incentive budget(s) such that the overall savings to the telecommunication service provider network 150 is not simply near the break-even point. For instance, a maximum inventive for a subscriber may be 20% less than the expected savings (e.g., within the next 6 months, the next year, the next 2 years, etc.) times the average conversion rate for the decile of the subscriber.

In one example, the incentives may be a reduction in a dollar amount or percentage of a subscription fee (e.g., $1.00 per month discount, $1.00 per month discount for 1 year, 2 years, etc.), may be an additional service (e.g., free premium channel subscription for 6 months, 1 year, etc.), an additional number of calling minutes and/or mobile data usage amount, and so forth. For those incentives that do not have direct monetary value, an operator may assign monetary values to such incentives such that the server(s) 135 may match these incentives as possibilities for different offers based upon the maximum budgets that are determined. It should be noted that in other, further, and different examples, the server(s) 135 may choose from possible incentives based upon current methods of payment (e.g., the same incentive may be offered to all current credit card-paying subscribers within the first decile, a same incentive may be offered to all current debit card-paying subscribers within a second decile, etc.).

As an alternative, or in addition, server(s) 135 may select subscribers for targeting with offers to enroll in new ACH payment agreements based upon the expected cost savings if such subscribers could be convinced to switch payment method(s). For instance, in general credit card payments may result in the highest fees incurred by the telecommunication service provider network 150, followed by debit card payments and checks. Thus, in one example, server(s) 135 may first select credit card paying subscribers to be prioritized for presenting offers to switch to ACH payment agreements. At a later time, server(s) 135 may select to present current debit card-paying subscribers with offers to switch. In still another example, server(s) 135 may first select credit card paying subscribers within the top three deciles to be prioritized for presenting offers to switch to ACH payment agreements, followed by debit card-paying subscribers in the first two deciles, followed by credit card-paying subscribers in the fourth decile, followed by debit card-paying subscribers in the third and fourth deciles, followed by check paying subscribers in the first four deciles, and so forth.

In one example, the server(s) 135 may implement a machine learning algorithm (MLA) to learn which incentives and/or the levels of incentives that may achieve the maximum overall long-term reward, such as a reinforcement learning (RL) technique and/or a deep reinforcement learning technique, such as: a Q-learning technique, a Markov decision process (MDP), a deep Q-learning technique, an actor-critic algorithm, and so forth. For instance, server(s) 135 may initially perform clustering and calculated distance metrics by region (e.g., by state). Server(s) 135 may present different incentives to different subscribers and then determine whether the incentives result in a greater conversion percentage (and by how much) as compared to no incentive and/or compared to other incentives. In one example, server(s) 135 may continue to adjust the types of incentives and/or the amount of the incentives and may track results for different subscribers based upon the subscribers' distance metrics and/or buckets (e.g., deciles) as well as the subscribers' current payment methods. Thus, over time and over multiple subscriber segments (e.g., region-by-region), the server(s) may optimize the incentives to present to subscribers based upon each subscriber's distance metric and current payment method.

Additional operations of server(s) 135 for selecting telecommunication network subscribers for offers to enroll in new automated clearing house payment agreements based upon distance measures to feature centroids for subscribers with existing automated clearing house payment agreements within a same cluster, and/or server(s) 135 in conjunction with one or more other devices or systems (such as DB(s) 136) are further described below in connection with the example of FIG. 5. In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in telecommunication service provider network 150, and so forth. Thus, these and other modifications are all contemplated within the scope of the present disclosure.

FIG. 5 illustrates a flowchart of an example method 500 for selecting telecommunication network subscribers for offers to enroll in new automated clearing house payment agreements based upon distance measures to feature centroids for subscribers with existing automated clearing house payment agreements within a same cluster. In one example, steps, functions, and/or operations of the method 500 may be performed by a device as illustrated in FIG. 1, e.g., one of the servers 135. Alternatively, or in addition, the steps, functions and/or operations of the method 500 may be performed by a processing system collectively comprising a plurality of devices as illustrated in FIG. 1 such as one or more of the server(s) 135, one or more of the server(s) 135 in conjunction with DB(s) 136, server(s) 155, and so forth. In one example, the steps, functions, or operations of method 500 may be performed by a computing device or processing system, such as computing system 600 and/or a hardware processor element 602 as described in connection with FIG. 6 below. For instance, the computing system 600 may represent at least a portion of a platform, a server, a system, and so forth, in accordance with the present disclosure. In one example, the steps, functions, or operations of method 500 may be performed by a processing system comprising a plurality of such computing devices as represented by the computing system 600. For illustrative purposes, the method 500 is described in greater detail below in connection with an example performed by a processing system (e.g., deployed in a telecommunication network). The method 500 begins in step 505 and proceeds to step 510.

At step 510, the processing system obtains data records of the telecommunication network including data associated with a plurality of subscribers. The data may include a number of devices associated with a subscriber account, one or more types of devices associated with the subscriber account, a service level associated with the subscriber account, a service usage level associated with the subscriber account, etc.

At step 515, the processing system clusters the plurality of subscribers into a plurality of clusters in accordance with the data associated with the plurality of subscribers. In one example, the clustering comprises an unsupervised clustering. In one example, the clustering comprises a principal component analysis (PCA) feature aggregation over the data associated with the plurality of subscribers.

At step 520, the processing system identifies a first set of subscribers of the plurality of subscribers enrolled in existing ACH payment agreements with the telecommunication network.

At step 525, the processing system identifies a second set of subscribers of the plurality of subscribers not enrolled in the existing ACH payment agreements with the telecommunication network.

At step 530, the processing system calculates a plurality of feature centroids for at least a portion of the plurality of clusters. For instance, for each cluster, the feature centroid may be for subscribers of the first set of subscribers (e.g., a subset of the first set of subscribers) who are part of the clusters. The feature centroid may be a centroid of the features based upon the data associated with the subset of the first set of subscribers who are part of the cluster, such as an average of the features within a feature space.

At step 535, the processing system calculates a plurality of distance measures for the second set of subscribers. For instance, for each respective subscriber of the second set of subscribers, the plurality of distance measures includes a respective distance measure of the respective subscriber of the second set of subscribers to a feature centroid for a subset of the first set of subscribers that is in a same cluster of the plurality of clusters as the respective subscriber of the second set of subscribers.

At optional step 540, the processing system may determine differences in transaction costs for subscribers of at least the subset of the second set of subscribers to enroll in the ACH payment agreements as compared to respective current payment methods for the subscribers of at least the subset of the second set of subscribers. For instance, for a given subscriber of the second set of subscribers, a difference in transaction costs comprises a difference in fees incurred by the telecommunication network associated with a respective current payment method of the given subscriber for a periodic subscription charge of the telecommunication network as compared to an ACH payment for the periodic subscription charge.

At step 545, the processing system selects a subset of the second set of subscribers based upon the plurality of distance measures for offers to enroll in new ACH payment agreements. In one example, the subset of the second set of subscribers is selected based upon at least one distance threshold that is applied to the plurality of distance measures. For instance, the threshold may be a distance measure-based cutoff or a percentile-based cutoff. In addition, the threshold may be a fixed threshold or an adaptive threshold. For example, an adaptive threshold may be adjusted based upon a budget, a conversion rate associated with prior observations of offers to convert/enroll in new ACH payment agreements, or other factors.

In one example, step 545 may include segregating at least the subset of the second set of subscribers (which, in one example, may include all of second set of subscribers) into buckets (e.g., tiers, deciles, quantiles, etc.) arranged by order of distance measures. In addition, in one example, the subset of the second set of subscribers may be selected from one or more of the buckets having subscribers of the second set of subscribers with closer (e.g., lower/lesser) distance metrics as compared to at least one other of the buckets. For example, the processing system may select the lowest distance bucket, e.g., the first bucket, but could also select the second bucket and/or the third bucket (while excluding the first bucket). For example, the first bucket may be assumed to be more likely to switch on their own without communications, or it may be determined or assumed that the second and third buckets contain subscribers who may switch without incentives, or with lesser incentives that the first bucket.

In this regard, it should also be noted that in one example, the subset of the second set of subscribers is further selected based upon a ranking of the differences in transaction costs for subscribers of the second set of subscribers to enroll in the ACH payment agreements (e.g., as may be determined at optional step 540). For instance, in one example, the subscribers having the greatest differences in transaction costs may be prioritized to include in the subset of the second set of subscribers for presenting offers to enroll in new ACH payment agreements. Notably, these subscribers may result in the greatest cost savings to the telecommunication network (if transitioned to ACH payment agreements). However, in another example, for subscribers who would be giving up credit card rewards and/or points to switch to ACH payment agreements, a correspondingly greater incentive may be provided. In view of this observation, in one example, other subscribers having favorable distance metrics (e.g., the least/closest distances to respective feature centroids) but who may be persuaded with lesser incentives may be selected to include in the subset of the second set of subscribers for offers to enroll in new ACH payment agreements. In still another example, the subset of the second set of subscribers may be selected based upon a ranking of the differences in transaction costs for subscribers of the second set of subscribers to enroll in the ACH payment agreements, where the differences in transaction costs may be modified by incentives that may be included along with the offers. For example, for a given subscriber, the telecommunication network may calculate a savings of $3.00 per month if the subscriber converted to ACH payment. However, if an incentive valued at $1.25 per month may be applied to induce the subscriber to switch, the anticipated difference in transaction cost may be $1.75.

In one example, step 545 may first include selecting one or more buckets, and then within the one or more buckets selecting subscribers based upon the relative transaction costs. For instance, the processing system may first determine a top 1 or top 2 buckets, or may simply apply a percentile or distance metric-based threshold to the second set of subscribers, and then further refine to select subscribers with a lower/higher relative transaction costs. In another example, step 545 may comprise selecting the subset of the second set of subscribers in a single pass, based upon combined criteria of the distance metrics and differences in transaction costs.

At optional step 550, the processing system may match incentives to the differences in transaction costs for at least a portion of the subset of the second set of subscribers. For instance, the incentives can be personalized to the transaction costs, or can be by certain categories (e.g., based upon types of credit cards having certain fees (and hence differences in transaction costs)). Alternatively, or in addition, at optional step 550 the processing system may match incentives to current payment methods of at least a portion of the subset of the second set of subscribers. For instance, in one example, the processing system may not actually calculate differences in transaction cost. It could be know that certain credit cards charge higher fees than others, and the incentives may be included in the offers accordingly. It should also be noted that in one example, less than all of the subset of the second set of subscribers may have associated incentives, or different portions of the subset of the second set of subscribers may have different incentives.

At step 555, the processing system presents communications to at least a portion of the subset of the second set of subscribers with the offers to enroll in the new ACH payment agreements. In one example, the offers may include respective incentives (if any) that may be matched to subscribers of the subset of the second set of subscribers at optional step 550. The communications may take various forms, such as email communications, text message communications, communications presented within a television viewing system interface (e.g., within an interactive television guide, or the like), communications presented in connection with an accessing of a subscriber account (e.g., presenting the offer in a pop-up, a side-bar message, etc.), a communication presented in a physically mailed or electronic version of a billing statement, another physically mailed document, postcard, or the like containing the offer, and so forth. In one example, the processing system may generate automated communications (e.g., automated emails, text messages, or the like). Alternatively, or in addition, the processing system may request or command another automated system to effect such communications (e.g., invoking an email server, a text message server, an automated mail generation and posting system, etc.).

At optional step 560, the processing system may determine a conversion rate of at least a portion of the subset of the second set of subscribers for enrolling in ACH payment agreements. In one example, such at least one portion may comprise a sampling of the subset of the second set of subscribers (e.g., a random sampling, a sampling of a given market, such as for a particular town, a particular state, etc., and so forth). In one example, such at least one portion may comprise those subscribers for whom incentives are provided in the offers presented in the communications of step 555. For instance, the processing system may utilize the conversion rate as a metric of an effectiveness of the incentive(s). In one example, multiple conversion rates may be determined for different portions of the subset of the second set of subscribers, such as a conversion rate associated with a first incentive, a conversion rate associated with a second incentive, a conversion rate associated with a first current payment method, a conversion rate associated with a second current payment method, etc.

At optional step 565, the processing system may select an additional subset of the second set of subscribers based upon the plurality of distance measures. For instance, the additional subset may be from subscribers of the second set of subscribers who were not selected at step 545 (e.g., those having lower, lesser, and/or the least distance metrics of those subscribers who remain, those in the next bucket(s), etc.). Alternatively, or in addition, the additional subset may be from a different geographic region or market as compared to the subset selected at step 545.

At optional step 570, the processing system presents additional communications to at least a portion of the additional subset of the second set of subscribers with additional offers to enroll in ACH payment agreements, where the additional offers include at least one incentive, wherein the at least one incentive is adjusted based upon at least one conversion rate (e.g., as may be determined at optional step 560). For instance, the at least one incentive may be calculated in accordance with a machine learning process based upon a cost of generating and sending the offers, the cost of the at least one incentive, the anticipated conversion rate(s), and the calculated savings per converted subscriber to maximize a predicted overall savings with respect to the additional subset of the second set of subscribers.

Following step 555 or any of optional steps 560-570, the method 500 proceeds to step 595 where the method 500 ends.

Furthermore, method 500 will account for subscriber data that indicates subscriber preferences that may indicate that certain subscribers may not want to receive any unwanted solicitation. Compliant with such subscriber preferences and/or requests, method 500 will not direct any offers to such subscribers.

It should be noted that method 500 may be expanded to include additional steps, or may be modified to replace steps with different steps, to combine steps, to omit steps, to perform steps in a different order, and so forth. For instance, in one example, the processing system may repeat one or more steps of the method 500, such as steps 510-555, steps 510-570, optional step 560-570, etc. For example, optional steps 560-570 may be repeated for additional subsets of the second set of subscribers. It should be noted that in one example, the method 500 may be performed with regard to a first segment of the telecommunication network (e.g., a state or other region), then the thresholds and/or incentives may be adjusted via feedback-based machine learning based upon the conversion rate(s) observed with regard to the iteration of the method for the first segment of the telecommunication network. Then the method 500 may be performed with regard to a second segment of the telecommunication network (e.g., a different state or another region). In one example, the method 500 may include obtaining a budget input (or multiple budget inputs through multiple iterations of the method 500, or portions thereof), e.g., from a computing device of telecommunication network personnel, or the like. In one example, the method 500 may include obtaining a set of permissible incentives, such as monetary incentives, service incentives, etc., such as a reduction in a dollar amount or percentage of a subscription fee, a free premium channel subscription, an additional number of calling minutes and/or mobile data usage, and so forth. In addition, in one example, the method 500 may further include selecting from among permissible incentives and/or adjusting specific values or ranges of such incentives to maximize an overall reward (cost savings), e.g., in accordance with a machine learning process which tracks conversion rates and the net savings (e.g., the differences in transactions costs for successful conversions, while accounting for the value of the incentives). Thus, these and other modifications are all contemplated within the scope of the present disclosure.

In addition, although not specifically specified, one or more steps, functions, or operations of the method 500 may include a storing, displaying, and/or outputting step as required for a particular application. In other words, any data, records, fields, and/or intermediate results discussed in the method 500 can be stored, displayed and/or outputted either on the device(s) executing the method 500, or to another device or devices, as required for a particular application. Furthermore, steps, blocks, functions, or operations in FIG. 5 that recite a determining operation or involve a decision do not necessarily require that both branches of the determining operation be practiced. In other words, one of the branches of the determining operation can be deemed as an optional step. In addition, one or more steps, blocks, functions, or operations of the above described method 500 may comprise optional steps, or can be combined, separated, and/or performed in a different order from that described above, without departing from the examples of the present disclosure.

Figure 6:
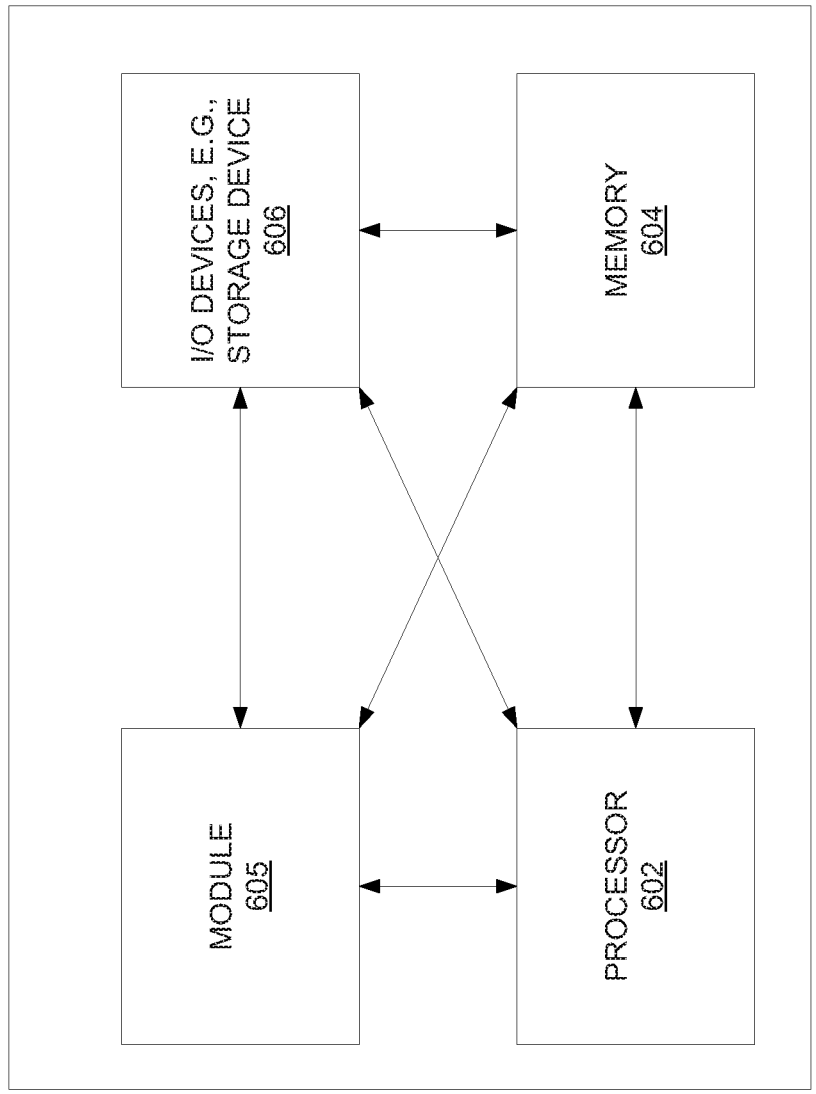
FIG. 6 illustrates a high-level block diagram of a computing device specially programmed to perform the functions described herein.

FIG. 6 depicts a high-level block diagram of a computing system 600 (e.g., a computing device, or processing system) specifically programmed to perform the functions described herein. For example, any one or more components or devices illustrated in FIG. 1, or described in connection with the FIGS. 2-5 may be implemented as the computing system 600. As depicted in FIG. 6, the computing system 600 comprises a hardware processor element 602 (e.g., comprising one or more hardware processors, which may include one or more microprocessor(s), one or more central processing units (CPUs), and/or the like, where hardware processor element may also represent one example of a "processing system" as referred to herein), a memory 604, (e.g., random access memory (RAM), read only memory (ROM), a disk drive, an optical drive, a magnetic drive, and/or a Universal Serial Bus (USB) drive), a module 605 for selecting telecommunication network subscribers for offers to enroll in new automated clearing house payment agreements based upon distance measures to feature centroids for subscribers with existing automated clearing house payment agreements within a same cluster, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 602 is shown, it should be noted that the computing device may employ a plurality of hardware processor elements. Furthermore, although only one computing device is shown in FIG. 6, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 6 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 602 can also be configured or programmed to cause other devices to perform one or more operations as discussed above. In other words, the hardware processor element 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 605 for selecting telecommunication network subscribers for offers to enroll in new automated clearing house payment agreements based upon distance measures to feature centroids for subscribers with existing automated clearing house payment agreements within a same cluster (e.g., a software program comprising computer-executable instructions) can be loaded into memory 604 and executed by hardware processor element 602 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for selecting telecommunication network subscribers for offers to enroll in new automated clearing house payment agreements based upon distance measures to feature centroids for subscribers with existing automated clearing house payment agreements within a same cluster (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    obtaining, by a processing system including at least one processor deployed in a telecommunication network, data records of the telecommunication network including data associated with a plurality of subscribers;
    clustering, by the processing system, the plurality of subscribers into a plurality of clusters in accordance with the data associated with the plurality of subscribers;
    identifying, by the processing system, a first set of subscribers of the plurality of subscribers enrolled in existing automated clearing house payment agreements with the telecommunication network;
    identifying, by the processing system, a second set of subscribers of the plurality of subscribers not enrolled in the existing automated clearing house payment agreements with the telecommunication network;
    calculating, by the processing system, a plurality of distance measures for the second set of subscribers, wherein for each respective subscriber of the second set of subscribers, the plurality of distance measures includes a respective distance measure of the respective subscriber of the second set of subscribers to a feature centroid for a subset of the first set of subscribers that is in a same cluster of the plurality of clusters as the respective subscriber of the second set of subscribers;
    selecting, by the processing system, a subset of the second set of subscribers based upon the plurality of distance measures for receiving an offer to enroll in a new automated clearing house payment agreement; and
    presenting, by the processing system, communications to the subset of the second set of subscribers with the offer to enroll in the new automated clearing house payment agreement.

2. The method of claim 1, wherein the feature centroid is one of a plurality of feature centroids, wherein each of the plurality of feature centroids is associated with a respective cluster of the plurality of clusters.

3. The method of claim 1, further comprising:
    calculating the plurality of feature centroids for at least a portion of the plurality of clusters.

4. The method of claim 1, wherein the clustering comprises an unsupervised clustering.

5. The method of claim 4, wherein the clustering comprises a principal component analysis feature aggregation over the data associated with the plurality of subscribers.

6. The method of claim 4, wherein the data associated with the plurality of subscribers comprises, for each subscriber, at least one of:
    a number of devices associated with a subscriber account;
    one or more types of devices associated with the subscriber account;
    a service level associated with the subscriber account;
    a billing address;
    an income category;
    a number of household members associated with the subscriber account;
    one or more types of telecommunications services of the telecommunication network associated with the subscriber account; or
    a service usage level associated with the subscriber account.

7. The method of claim 1, wherein the subset of the second set of subscribers is selected based upon at least one distance threshold that is applied to the plurality of distance measures.

8. The method of claim 7, wherein the at least one distance threshold comprises:
    at least one distance measure-based cutoff; or
    at least one percentile-based cutoff.

9. The method of claim 7, wherein the at least one distance threshold comprises at least one adaptive threshold that is adjusted based upon at least one of:
    a budgetary constraint; or
    at least one conversion rate of at least one set of prior offers to a third set of subscribers to enroll in an automated clearing house payment agreement.

10. The method of claim 1, wherein the selecting the subset of the second set of subscribers comprises:
    segregating at least the subset of the second set of subscribers into a plurality of buckets arranged by order of distance measures.

11. The method of claim 10, wherein the subset of the second set of subscribers is selected from one or more of the plurality of buckets having subscribers of the second set of subscribers with closer distance metrics as compared to at least one other of the plurality of buckets.

12. The method of claim 1, further comprising:
    determining differences in transaction costs for subscribers of at least the subset of the second set of subscribers to enroll in the automated clearing house payment agreement as compared to a respective current payment method for the subscribers of at least the subset of the second set of subscribers.

13. The method of claim 12, wherein for a given subscriber of the second set of subscribers, a difference in transaction costs comprises a difference in fees incurred by the telecommunication network associated with a respective current payment method of the given subscriber for a periodic subscription charge of the telecommunication network as compared to an automated clearing house payment for the periodic subscription charge.

14. The method of claim 12, wherein the subset of the second set of subscribers is further selected based upon a ranking of the differences in transaction costs for subscribers of the second set of subscribers to enroll in the automated clearing house payment agreement.

15. The method of claim 12, further comprising:
matching incentives to the differences in transaction costs for at least a portion of the subset of the second set of subscribers, wherein the incentives are included in the communications for the at least the portion of the subset of the second set of subscribers.

16. The method of claim 1, further comprising:
matching an incentive to a current payment method of at least a portion of the subset of the second set of subscribers, wherein the incentive is included in the communications for the at least the portion of the subset of the second set of subscribers.

17. The method of claim 1, further comprising:
determining a conversion rate of at least a portion of the subset of the second set of subscribers for enrolling in the automated clearing house payment agreement.

18. The method of claim 1, further comprising:
selecting an additional subset of the second set of subscribers based upon the plurality of distance measures; and
presenting additional communications to the additional subset of the second set of subscribers with an additional offer to enroll in the automated clearing house payment agreement, wherein the additional offer includes at least one incentive, wherein the at least one incentive is adjusted based upon the conversion rate.

19. A non-transitory computer-readable medium storing instructions which, when executed by a processing system including at least one processor deployed in a telecommunication network, cause the processing system to perform operations, the operations comprising:
obtaining data records of the telecommunication network including data associated with a plurality of subscribers;
clustering the plurality of subscribers into a plurality of clusters in accordance with the data associated with the plurality of subscribers;
identifying a first set of subscribers of the plurality of subscribers enrolled in existing automated clearing house payment agreements with the telecommunication network;
identifying a second set of subscribers of the plurality of subscribers not enrolled in the existing automated clearing house payment agreements with the telecommunication network;
calculating a plurality of distance measures for the second set of subscribers, wherein for each respective subscriber of the second set of subscribers, the plurality of distance measures includes a respective distance measure of the respective subscriber of the second set of subscribers to a feature centroid for a subset of the first set of subscribers that is in a same cluster of the plurality of clusters as the respective subscriber of the second set of subscribers;
selecting a subset of the second set of subscribers based upon the plurality of distance measures for receiving an offer in a new automated clearing house payment agreement; and
presenting communications to the subset of the second set of subscribers with the offer to enroll in the new automated clearing house payment agreement.

20. An apparatus comprising:
a processing system including at least one processor; and
a non-transitory computer-readable medium storing instructions which, when executed by the processing system, cause the processing system to perform operations, the operations comprising:
obtaining data records of the telecommunication network including data associated with a plurality of subscribers;
clustering the plurality of subscribers into a plurality of clusters in accordance with the data associated with the plurality of subscribers;
identifying a first set of subscribers of the plurality of subscribers enrolled in existing automated clearing house payment agreements with the telecommunication network;
identifying a second set of subscribers of the plurality of subscribers not enrolled in the existing automated clearing house payment agreements with the telecommunication network;
calculating a plurality of distance measures for the second set of subscribers, wherein for each respective subscriber of the second set of subscribers, the plurality of distance measures includes a respective distance measure of the respective subscriber of the second set of subscribers to a feature centroid for a subset of the first set of subscribers that is in a same cluster of the plurality of clusters as the respective subscriber of the second set of subscribers;
selecting a subset of the second set of subscribers based upon the plurality of distance measures for receiving an offer in a new automated clearing house payment agreement; and
presenting communications to the subset of the second set of subscribers with the offer to enroll in the new automated clearing house payment agreement.

* * * * *